United States Patent
Latham et al.

(10) Patent No.: US 6,298,774 B1
(45) Date of Patent: Oct. 9, 2001

(54) BARBECUE GRILL WITH AN AUTOMOBILE-SHAPED COVER

(76) Inventors: Gary A. Latham; Maria V. Latham, both of 2420 N. Circle St., Ann Arbor, MI (US) 48103

( * ) Notice: Subject to any disclaimer, the term of this patent is extended or adjusted under 35 U.S.C. 154(b) by 0 days.

(21) Appl. No.: 09/779,503

(22) Filed: Feb. 9, 2001

(51) Int. Cl.$^7$ .............. A47J 37/00; A47J 37/04; A47J 37/07
(52) U.S. Cl. ................ 99/340; 99/400; 99/401; 99/444; 99/446; 99/450; 99/482; 126/25 R; 126/9 R
(58) Field of Search ............. 99/339, 340, 352, 99/400, 401, 444–450, 481, 482; 126/9 R, 25 R, 25 A, 41 R, 29, 30

(56) References Cited

U.S. PATENT DOCUMENTS

| | | |
|---|---|---|
| D. 324,153 | 2/1992 | Wood . |
| D. 395,982 | 7/1998 | Dunn et al. . |
| D. 397,580 | 9/1998 | Dunn et al. . |
| 860,991 | 7/1907 | Reynolds . |
| 1,259,417 | 3/1918 | Lamb . |
| 1,504,097 | 8/1924 | Carpenter . |
| 1,521,148 | 12/1924 | Dennett et al. . |
| 2,253,833 * | 8/1941 | Volks ................................ 99/446 |
| 2,413,204 * | 12/1946 | Wolff ................................ 99/447 X |
| 3,987,719 * | 10/1976 | Kian ................................ 99/444 |
| 4,311,460 | 1/1982 | Laversdorf et al. . |
| 4,373,511 * | 2/1983 | Miles et al. ........................ 126/25 R |
| 4,800,865 * | 1/1989 | Setzer ............................... 99/401 X |
| 4,922,079 * | 5/1990 | Bowen et al. ..................... 99/446 X |
| 5,097,753 * | 3/1992 | Bowen et al. ..................... 99/400 X |
| 5,107,096 * | 4/1992 | Knees ............................... 99/446 |
| 5,197,379 | 3/1993 | Leonard, Jr. . |
| 5,313,877 * | 5/1994 | Holland ............................. 99/447 X |
| 5,351,068 * | 9/1994 | Muchin ............................. 99/339 X |
| 5,431,091 * | 7/1995 | Couture ............................. 99/447 X |
| 5,582,094 | 12/1996 | Peterson et al. . |
| 5,782,165 * | 7/1998 | Glenboski et al. ................ 99/340 |
| 5,873,300 * | 2/1999 | Kuhlman .......................... 99/422 X |

FOREIGN PATENT DOCUMENTS 16558   10/1890   (GB) .

* cited by examiner

Primary Examiner—Timothy F. Simone
(74) Attorney, Agent, or Firm—Stephen R. Greiner

(57) ABSTRACT

An outdoor barbecue grill including a cooking chamber with a lower portion and an upper portion removably positioned atop the lower portion. An automobile-shaped cover surrounds upper portion at a distance so as to form an insulative air gap therebetween. At locations reminiscent of automobile tail pipes, one or more conduits extend from the upper portion of the cooking chamber and through the cover for venting heat and smoke from said cooking chamber.

8 Claims, 1 Drawing Sheet

BARBECUE GRILL WITH AN AUTOMOBILE-SHAPED COVER

FIELD OF THE INVENTION

The present invention relates generally to stoves and furnaces and, in particular to outdoor cookers.

BACKGROUND OF THE INVENTION

Stock car racing is America's fastest growing sport. In recent years, fans of the sport have purchased racing-related products at a similarly increasing rate. Apparel and other household items emblazoned with the names and logos of: drivers, racing associations, and team sponsors have sold particularly well. Some have even proposed products like a barbecue grill cover designed to resemble a stock car.

The known grill cover design, although possessing some charm, appears to be deficient in ways that limit its commercial acceptance. A one-piece construction and a lack of exhaust holes appear to mandate that the cover be set aside while cooking takes place on the grill. A need, therefore, exists for a barbecue grill with an automobile-shaped cover that can be enjoyed without disassembly for cooking.

SUMMARY OF THE INVENTION

In light of the problems associated with the known barbecue grill cover designs, it is a principal object of the invention to provide a barbecue grill with a cover having an ornamental shape through which smoke and heat may be ported so that the cover may be utilized during cooking.

It is another object of the invention to provide a barbecue grill of the type described having a cover shaped like an automobile wherein smoke and heat from the interior of the grill are vented through the cover in locations simulative of the dual exhaust pipes of the automobile. Such venting is from one side of the grill thereby permitting smoke and heated air to accumulate around foods, imparting a smoky flavor and limiting cooking times.

It is an object of the invention to provide improved elements and arrangements thereof in a barbecue grill for the purposes described which is lightweight in construction, inexpensive to manufacture, and dependable in use.

Briefly, the barbecue grill in accordance with this invention achieves the intended objects by featuring a cooking chamber having a lower portion and a removable, upper portion. A cover, shaped like an automobile, surrounds the upper portion at a distance so as to form an insulative air gap between the cover and the upper portion. A pair of conduits extends laterally from the upper portion and through the cover for venting heat and smoke in a manner like that of the tail pipes of an automobile.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
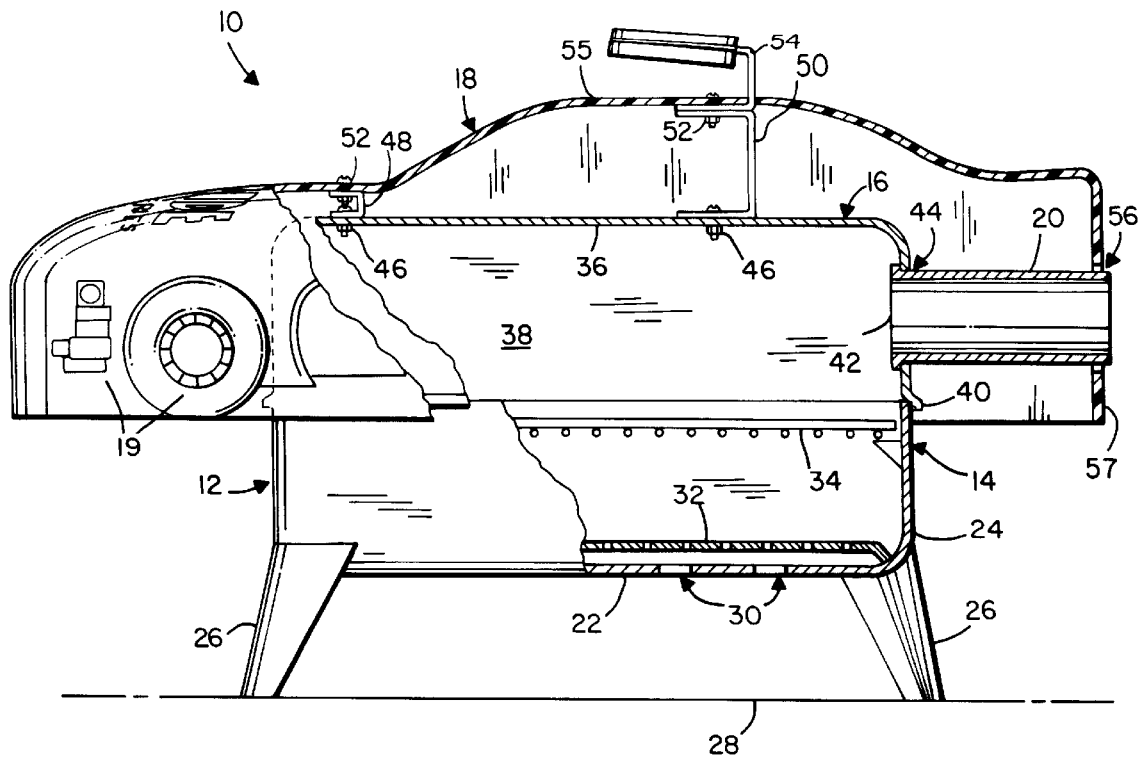
FIG. 1 is a side view of a barbecue grill in accordance with the present invention having portions broken away to reveal details thereof.
Figure 2:
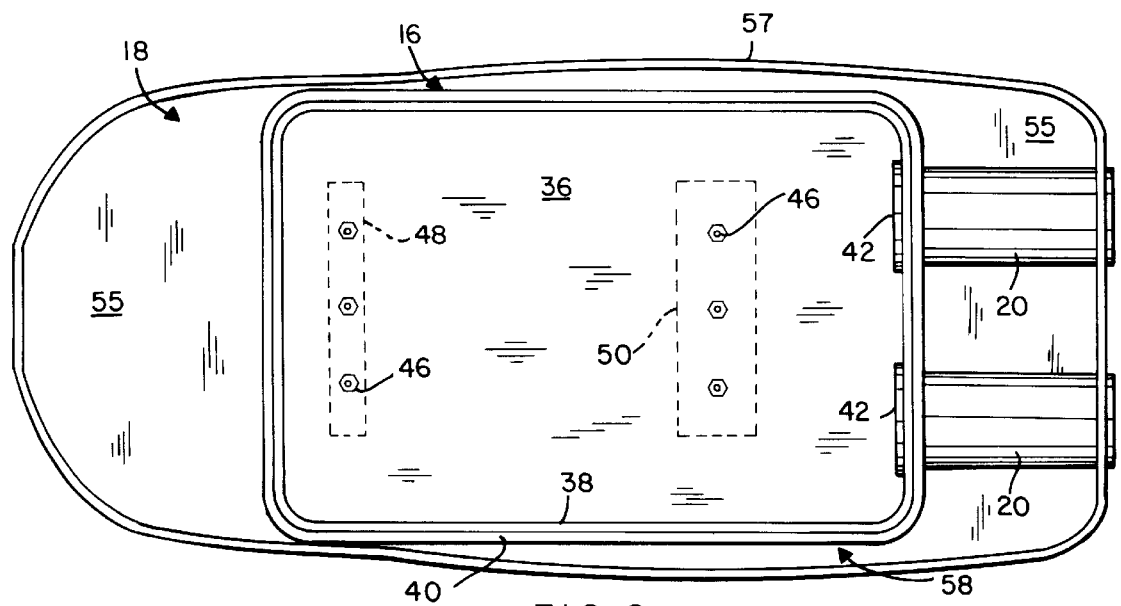
FIG. 2 is a bottom view of the cover of the barbecue grill.

Referring now to the FIGS., a barbecue grill in accordance with the present invention is shown at 10. Grill 10 includes a cooking chamber 12 having a lower portion 14 and a selectively removable upper portion 16. Atop upper portion 16 is secured a cover 18 shaped like an automobile. A pair of substantially horizontal conduits 20 extends outwardly from upper portion 16 through cover 18 to exhaust heat and smoke from cooking chamber 12 as well as to simulate the appearance of automobile exhaust pipes.

Lower portion 14 of cooking chamber 12 is formed of metal and includes a rectangular bottom wall 22 and a side wall 24 extending upwardly from the periphery of bottom wall 22. Legs 26 extend downwardly from the corners of bottom wall 22 to support cooking chamber 12 at a height above horizontal surface 28. Vents 30 are provided in bottom wall 22 for the entry of air into chamber 12.

Positioned atop bottom wall 22 is a perforated grate 32 upon which charcoal may be burned to cook food in chamber 12. (Of course, other heat sources such as natural gas burners or electrical resistance heating elements (neither shown) may be substituted for grate 32 and associated charcoal.) Suspended from side wall 24 above grate 32 is a wire frame 34 upon which food may be positioned for cooking.

Upper portion 16 of cooking chamber 12 is formed of metal and includes a rectangular top wall 36 and a side wall 38 extending downwardly from the periphery of top wall 36. The bottom of side wall 38 is provided with a lip 40 for engaging the top of side wall 24 and for preventing lower and upper portions 14 and 16 from inadvertently disengaging.

Tubular conduits 20 extend horizontally in parallel fashion from side wall 38. Conduits 20 are preferably formed of metal and have their inner ends 42 snugly secured within openings 44 provided therefor in side wall 38. Conduits 20 are affixed to side wall 38 by any suitable means such as welding.

Secured atop top wall 36 by means of threaded fasteners 46 is a pair of brackets 48 and 50 principally for supporting cover 18 at a fixed height above upper portion 16. Brackets 48 and 50 are C-shaped, each having a pair of opposed legs fastened by a central member, but other bracket configurations may be used. Threaded fasteners 52 secure brackets 48 and 50 to cover 18 as well as to a C-shaped handle 54 that protrudes from top wall 55 of cover 18.

Cover 18, formed of fiberglass or other heat-resistant material, is maintained at a fixed distance from upper portion 16 by brackets 48 and 50. Openings 56 in side wall 57 of cover 18 accommodate the passage of conduits 20. The air gap 58 between upper portion 16, conduits 20 and cover 18 keeps cover 18 relatively cool during cooking. Thus, decals 19 or other indicia on cover 18 bearing the names and logos of drivers, racing associations, and team sponsors are not harmed during use of grill 10. Preferably, cover 18 extends below upper portion 16 to hide lip 40 and to permit any smoke that may leak around lip 40 to be captured beneath cover 18.

Use of barbecue grill 10 is straightforward. First, a heat source such as charcoal is positioned in lower portion 14 of cooking chamber 12 and caused to emit heat. Next, hotdogs, hamburgers, chicken or other foods are positioned on wire frame 34 for cooking. Upper portion 16 is, then, maneuvered atop lower portion 14. By means of handle 54, upper portion 16 may be removed from lower portion 14 to periodically check cooking progress. Excess heat and smoke are vented through conduits 20 as cooking progresses simulating a running automobile in an amusing and visually appealing manner.

While the invention has been described with a high degree of particularity, it will be appreciated by those skilled in the art that modifications may be made thereto. For example, the cover may be shaped like other items that emit smoke such as: a steam locomotive, a dragon or a volcano. Therefore, it is to be understood that the present invention is not limited to the sole embodiment described above, but encompasses any and all embodiments within the scope of the following claims.

We claim:

1. A barbecue grill, comprising:
    a cooking chamber having a lower portion and an upper portion removably positioned atop said lower portion;
    a cover secured to said upper portion, said cover surrounding said upper portion at a distance so as to form an insulative air gap therebetween; and,
    a substantially horizontal conduit penetrating said upper portion and said cover for venting heat and smoke from said cooking chamber.

2. The barbecue grill according to claim 1 further comprising a handle projecting from said cover for manipulating said upper portion of said cooking chamber.

3. A barbecue grill, comprising:
    a cooking chamber including:
        a lower portion for receiving a heat source and supporting food for cooking; and,
        an upper portion removably positioned atop said lower portion, said upper portion having a first top wall and a first side wall extending downwardly from the periphery of said first top wall;
    a plurality of legs secured to said lower portion for supporting said cooking chamber at a predetermined height above a supporting surface;
    a plurality of brackets extending outwardly from said upper portion;
    a cover supported at a fixed distance from said upper portion by said brackets, said cover having a second top wall and a second side wall extending downwardly from the periphery of said second top wall; and,
    a first substantially horizontal conduit penetrating said first side wall and said second side wall for venting heat and smoke from said cooking chamber.

4. The barbecue grill according to claim 3 further comprising a second substantially horizontal conduit penetrating said first side wall and said second side wall for venting heat and smoke from said cooking chamber, and said second conduit being positioned adjacent said first conduit.

5. The barbecue grill according to claim 3 further comprising a handle projecting from said cover for manipulating said upper portion of said cooking chamber.

6. The barbecue grill according to claim 3 wherein said second side wall extends below said first side wall.

7. A barbecue grill, comprising:
    a cooking chamber including:
        a lower portion for receiving a heat source and supporting food for cooking; and,
        an upper portion removably positioned atop said lower portion, said upper portion having a first top wall and a first side wall extending downwardly from the periphery of said first top wall;
    a plurality of legs secured to said lower portion for supporting said cooking chamber at a predetermined height above a supporting surface;
    a plurality of brackets extending outwardly from said upper portion;
    a cover supported at a fixed distance from said upper portion by said brackets, said cover having a second top wall and a second side wall extending downwardly from the periphery of said second top wall;
    a handle secured to one of said brackets and extending from said cover for manipulating said upper portion of said cooking chamber; and,
    a pair of conduits extending laterally from said first side wall of said upper portion and through said second side wall of said cover for venting heat and smoke from said cooking chamber.

8. The barbecue grill according to claim 7 wherein said cover is shaped like an automobile having a front and a rear and said conduit passes laterally through said cover in a location at the rear of the automobile.

* * * * *